United States Patent Office 3,703,392
Patented Nov. 21, 1972

---

3,703,392
SHAPED ARTICLES OF IMPROVED DYEABILITY
Joseph Di Pietro, Alma, Mich., assignor to Celanese Corporation, New York, N.Y.
No Drawing. Original application June 30, 1965, Ser. No. 468,581. Divided and this application Sept. 8, 1970, Ser. No. 70,552
Int. Cl. C08b 21/04
U.S. Cl. 106—177                                                6 Claims

---

ABSTRACT OF THE DISCLOSURE

A composition of improved dye receptivity comprising a polymer capable of being formed into shaped articles and a sulfonated aryl phosphate or an aryl phospate alkali metal sulfonate.

---

This application is a divisional of U.S. application Ser. No. 468,581 filed June 30, 1965.

This invention relates to the production of shaped articles having improved receptivity for disperse and/or basic dyes.

There exists a wide variety of polymers possessing certain desirable properties which make them useful when formed into shaped articles such as filaments or films but which are relatively difficult to dye to use disperse dyes, basic dyes or both classes of dyes. The use of dyes from each of these classes involves a combination of processing and product advantages as well understood in the art. However, shaped articles prepared from certain types of polymers often cannot be colored in deep shades with one or both of these classes of dyes because of poor receptivity for such dyes. Thus any method used to obtain an improvement in the receptivity of shaped articles such as filaments for one or both of these classes of dyes where such receptivity is presently less than desirable, is much to be desired. It should be noted in this connection that there are very few shaped articles prepared from a spinning dope or melt which possess adequate receptivity to both disperse and basic dyes.

In accordance with one aspect of the invention, a polymer capable of being formed into shaped articles such as filaments or films having less than completely adequate receptivity for disperse and/or basic dyes, is shaped to form such articles in the presence of a sulfonated aryl phosphate, i.e., an aryl phosphate in which one or more aryl hydrogen atoms is substituted with a sulfonate group. If the polymer is being formed into shaped articles such as filaments by means of melt extrusion techniques, the phosphate may be incorporated into the melt prior to extrusion. When it is desired to dry or wet extrude the polymer, the phosphate may be mixed with the spinning dope or solution prior to extrusion. While the mechanism by which the polymers are rendered more dye receptive is not known, it is thought that the sulfonated aryl phosphate does not chemically combine with the polymer.

The sulfonated aryl phosphates contemplated under this invention may be prepared for example by reacting the unmodified aryl phosphate with sulfur trioxide, the latter preferably in the form of a solution in an inert solvent such as ethylene chloride. Specific conditions for the preparation of these compounds are shown in U.S. Pat. 3,549,729 which issued on a continuation of application Ser. No. 468,612, filed June 30, 1965, now abandoned, by Joseph Di Pietro and Merrill N. O'Brien, Jr. and assigned to the same assignee as this aplication.

A particularly important group of phosphates which may be utilized under this invention are the sulfonated triaryl phosphates, e.g., any of the following compounds containing one or more sulfonate groups substituted for an aryl hydrogen atom: triphenyl phosphate, tricresyl phosphate, o-phenylphenyl bis(phenyl) phosphate, tris-(o-phenylphenyl) phosphate, tri(2,5 - dimethylphenyl) phosphate, tri(2,6 - dimethylphenyl) phosphate, tri(3,5-dimethylphenyl) phosphate, tri(2,3,5 - dimethylphenyl) phosphate, tri(beta-naphthyl) phosphate, the dialkyl monoaryl phosphates such as dimethyl monophenyl phosphate and diethyl monophenyl phosphate, the di-aryl monoalkyl phosphates such as diphenyl monomethyl phosphate and dicresyl monomethyl phosphate, and the bis phosphate of alkylene glycols and dialkylene glycols such as bis (dicresyl phosphate) of diethylene glycol. Sulfonated aryl phosphates containing at least one aryl group of multiple ring structure, e.g. phenyl phenyl such as o-phenylphenyl, are preferred.

The sulfonate groups in the sulfonated aryl phosphate added to the polymer melt or dope may be in the free acid form but are preferably in the form of a salt, most suitably an alkali metal salt, e.g., of potassium or sodium.

The sulfonated aryl phosphate employed in the process of this invention generally contains from one to about six sulfonate groups, preferably from one to about three sulfonate groups from each benzene ring in the compound.

The sulfonated aryl phosphate is used in an amount such that a minor portion of the compound remains dispersed throughout the cross section of the shaped article, e.g., the individual filaments. In many cases the amount of phosphate in the shaped article will be in the range of about 1 to 10%, preferably 3 to 6% by weight.

The invention may be applied to a wide variety of polymers which may be formed into shaped articles such as filaments having less than the desired degree of receptivity for disperse and/or basic dyes. A particularly significant group of polymers to which this invention may be applied are the olefin polymers which are not easily dyed with disperse or basic dyes, e.g. polypropylene, poly-3-methyl butene-1, poly-4-methyl pentene-1, polyethylene as well as copolymers of propylene, 3-methyl butene-1, 4-methyl pentene-1, or ethylene with each other or with minor amounts of other olefins, e.g. copolymers of propylene and ethylene copolymers of a major amount of 3-methyl butene-1 and a minor amount of a straight chain n-alkene such as n-octene-1, n-hexene-1, n-hexadecene-1, n-octadecene-1, or other relatively long chain alkenes, as well as copolymers of 4-methyl pentene-1, and any of the same n-alkenes mentioned previously in connection with 3-methyl butene-1. These polymers are generally formed into filaments and films by melt extrusion.

Another very important group of polymers are the fiber-forming linear polyesters of polyhydric alcohols, e.g. glycols such as ethylene glycol, diethylene glycol, dimethylol cyclohexane and the like or mixtures thereof with polycarboxylic acids, e.g. dicarboxylic acids such as terephthalic acid, phthalic acid, isophthalic acid, 5-sulfoisophthalic acid, adipic acid and the like and mixtures thereof, as well as fiber-forming linear polyesters of hydroxycarboxylic acid, e.g. polyglycolic acid. A particularly important material within this group is polyethylene terephthalate. The polymers are generally melt extrudable.

Another group of polymers which may be formed into shaped articles of improved disperse and basic dyeability under this invention are the oxymethylene polymers. While oxymethylene homopolymers are contemplated, the preferred oxymethylene polymer is a "random" oxymethylene copolymer, i.e., one which contains recurring oxymethylene, i.e., —$CH_2O$—, units interspersed with

—OR— groups in the main polymer chain where R is a divalent radical containing at least two carbon atoms directly linked to each other and positioned in the chain between the two valences, with any substituents on said R radical being inert, that is, those which do not include interfering functional groups and which will not induce undesirable reactions, and wherein a major amount of the —OR— units exist as single units attached to oxymethylene groups on each side. A random copolymer may thus be distinguished over a block copolymer wherein repeating units of each monomer make up block segments containing little or no units of any other monomer. Thus, in block copolymers containing oxymethylene and other units, susbtantially all of the other units are attached to like units rather than oxymethylene units on each side. Particularly preferred are random copolymers which contain from 60 to 99.6 mol percent of recurring oxymethylene groups. In a preferred embodiment R may be, for example, an alkylene or substituted alkylene group contining at least two carbon atoms. Examples of preferred polymers include copolymers of trioxane and cyclic ethers containing at least two adjacent carbon atoms such as the copolymers disclosed in U.S. Pat. No. 3,027,352 of Walling et al.

The preferred random oxymethylene copolymers included within this invention are thermoplastic materials having a melting point of at least 150° C. and are normally millable at a temperature of 200° C. They have a number average molecular weight of at least 10,000. These preferred polymers have a high thermal stability. For example, if the stabilized oxymethylene polymer used in a preferred embodiment of this invention is placed in an open vessel in a circulating air oven at a temperature of 230° C. and its weight loss is measured without removal of the sample from the oven, it will have a thermal degradation rate of less than 1.0 wt. percent/min. for the same period of time.

The preferred random oxymethylene copolymers have an inherent viscosity of at least one (measured at 60° C. in a 0.1 weight percent solution in p-chlorophenol containing 2 weight percent of α-pinene). The preferred copolymers of this invention exhibit remarkable alkaline stability. For example, if the preferred copolymers are refluxed at a temperature of about 142° C.–145° C. in a 50% solution of sodium hydroxide in water for a period of 45 minutes, the weight of the copolymer will be reduced by less than one percent.

As used in the specification and claims of this application, the term "copolymer" means polymers having two or more types of monomeric units, including terpolymers and higher polymers. Suitable oxymethylene terpolymers are those having more than two different kinds of monomeric units such as those disclosed in U.S. patent application Ser. No. 229,715, filed Oct. 10, 1962 by Walter E. Heinz and Francis B. McAndrew, which application is assigned to the same assignee as the subject application. Oxymethylene polymers are usually formed into shaped articles by melt extrusion.

Another group of polymers which may be formed into shaped articles of improved disperse and basic dye receptivity in accordance with the invention are the cellulose esters and an especially significant class of cellulose esters are the cellulose triesters of fatty acids such as acetic, formic, propionic, butyric and the like which contain fewer than about 0.29, and preferably fewer than about 0.12 free hydroxyl groups per anhydroglucose units in the cellulose molecule. A particularly important material within this group is cellulose triacetate containing more than 59% and preferably more than 61% of acetyl groups calculated as combined acetic acid. Cellulose triacetate is generally dry extruded from solution in the solvent comprising a major amount of halogenated alkane, e.g. a mixture of 90% of methylene chloride and 10% of methanol to form shaped articles such as filaments and films.

The invention may also be applied to cellulose esters containing more than 0.29 hydroxyl groups per anhydroglucose unit, e.g. cellulose acetate containing 54–56% of acetyl groups calculated as combined acetic acid. Secondary cellulose acetate is generally dry extruded from solution in acetone to form shaped articles such as filaments and films.

Other polymers contemplated under this invention for the improvement of dye receptivity are fiber-forming polyamides such as poly(polymethylene) terephthalamides, adipamides and sebacamides in which the polymethylene groups contain 2 to 8 carbon atoms, e.g. polyhexamethylene terephthalamide and polyhexamethylene adipamide, polyaminoalkanoic acid, e.g. polyaminocaproic acid, fiber-forming polyurethanes such as the polyurethane formed from the bis(chloroformate) of butanediol and tetramethylene diamine, fiber-forming polymers and copolymers of acrylonitrile, e.g. containing more than 40 percent and preferably more than 85 percent of acrylonitrile residues in the polymer chain, e.g. polyacrylonitrile and copolymers of acrylonitrile and various comonomers, e.g. vinyl esters such as vinyl acetate, vinyl amines, vinyl pyridine, methyl vinyl pyridine, chloroethyl vinyl ethers, etc., and fiber-forming polymers of vinylidene cyanide such as those containing at least 50 mol percent of vinylidene cyanide in the polymer chain, e.g. a copolymer of 50 mol percent vinylidene cyanide and 50 mol percent of vinyl acetate.

The disperse dyes which are more easily applied to filamentary material as a result of this invention are generally non-ionic compounds which are applied in the form of a dispersion in an aqueous bath. These dyes have long been applied to secondary cellulose acetate and include azo dyes, anthtraquinone dyes and aryl amine dyes.

The basic dyes contemplated also include azo dyes, anthraquinone dyes and aryl amine dyes and form cations in aqueous solution capable of attachment to acidic or anionic dye sites on the substrate to be dyed.

The following examples further illustrate the invention:

EXAMPLE I

A sample of tris-(o-phenylphenyl) phosphate (55 g.) in 150 ml. of ethylene chloride is placed in a flask. Liquid $SO_3$ (24 g.) in ethylene chloride is slowly added to the mixture, which is kept at 5–10° C. and constantly stirred. During this addition small amount of fibrous crystals are formed. The reaction mixture is transferred into a separatory funnel and extracted with n-heptane. The bottom oil layer is added to a $K_2CO_3$ solution, followed by addition of a KCl solution. A water white crystalline solid is obtained which analysis showed to be tris-(o-phenylphenyl) phosphate mono(potassium sulfonate).

To a sample of 5 g. of a stereospecific copolymer of 3-methyl butene-1 and 1.5 mol percent n-hexadecene is added 0.25% by weight of a heat stabilizer and 5% by weight of tris-(o-phenylphenyl phosphate) mono(potassium sulfonate) prepared as described above, based on the weight of the polymer. The sample was dried under vacuo at 60° C. and then it was melt extruded through an orifice of about 15 mils at 350° C., to produce fibers which are taken up at a speed such that they are drawn down to about 8 to 10 denier per filament.

The sample was also present between hot plates at about 350° C. to produce a film of about 0.1 to 0.15 mil thickness.

These fibers and films possess receptivity for disperse and basic dyes, whereas fibers spun in the same way from the same copolymer but without the sulfonate do not possess such receptivity. The comparative tests for disperse and basic dyeability are carried out as follows:

In the case of disperse dyeability, 100 mg. of filament or film sample is agitated for 2 hours in 300 ml. of an aqueous dyebath at 97° C. containing ½ g./l. of Igepon T–77 surfactant [sodium fatty methyl tauride, $C_{17}H_{33}$ Co·N($CH_3$) $C_2H_5SO_3Na$], ½ g./l. of Calgon (sodium hexametaphosphate) and 150 mg. of a disperse dye such as Eastman Fast Blue BGLF (C.I. Part II No. 60767), Eastman Blue BNN (C.I. Part II No. 61505) or Celliton Pink BA-CF (C.I. Part II No. 60710). The sample is then washed and dried.

For basic dyeability, the same procedure as that described above for disperse dyeability is used except that dye used is a basic dye such as Sevron Blue B (C.I. Basic Blue 2) or Sevron Brillian Red B (C.I. Disperse Red 15) and before dyeing, the pH of the dyebath is decreased to about 4.5 with sodium acetate and acetic acid.

The relative degree of dye uptake is determined both by visual appearance of the sample and by study of the cross-section of the filament or film with a polarizing microscope to determine the degree of penetration of the dye.

The foregoing tests show that the sample containing the aryl phosphate sulfonate picks up a greater amount of both disperse and basic dye than the sample containing no sulfonate.

EXAMPLE II

The procedure of Example I is repeated except that the polymer which is melt spun is stereospecific polypropylene. Similar results are obtained.

EXAMPLE III

The procedure of Example I is repeated except that the polymer which is melt spun is polyethylene. Similar results are obtained.

EXAMPLE IV

The sulfonation procedure of Example I is repeated except that 48 g. of liquid $SO_3$ dissolved in 160 cc. of ethylene dichloride is added to the phosphate and the reaction is carried out at 40° C. for 4½ hours. The product is analyzed to be tris(o-phenylphenyl) phosphate tri(potassium sulfonate) which is thermally stable to 350° C.

The melt spinning procedure of Example I is repeated with the trisulfonate of this example. The fibers have improved receptivity to disperse and basic dyes.

In accordance with another aspect of the invention, a minor amount of an unsubstituted, unmodified aryl phosphate is blended into the polymer with the sulfonated aryl phosphate to obtain an increased enhancement of dye receptivity, better homogeneity of the shaped article and improved evenness of dyeing, i.e. less streakiness.

The unsubstituted aryl phosphate may be any of the aryl phosphates mentioned previously, which when containing sulfonate groups are suitable for the sulfonated aryl phosphates of this invention, and may be used for example in an amount of about 3 to 10% based on the weight of the polymer.

Examples V, VI and VII illustrate the use of an unsubstituted aryl phosphate with the sulfonated aryl phosphate of this invention.

EXAMPLE V

The sulfonation procedure of Example I is followed except that the aryl phosphate subjected to the described sulfonation treatment is 0.05 gram mol of tris-(beta-naphthyl) phosphate, the $SO_3$ is added as a solution of 32 g. (0.4 mol) in 150 cc. of 1,1,2-trichloroethane and the reaction is carried out at a temperature of 10–15° C. for 2¼ hours. The product is analyzed to be tris(beta-naphthyl) phosphate penta(potassium sulfonate) and is thermally stable to 350° C.

The spinning procedure of Example I is followed except that 5% by weight of the pentasulfonate together with 5% by weight of n-octyl phenyl dicresyl phosphate and 0.25% by weight of a heat stabilizer, all based on the weight of the polymer, are blended with the copolymer of 3-methyl butene-1 and n-hexadecene prior to melt spinning.

The fibers obtained have improved receptivity for disperse and basic dyes.

EXAMPLE VI

The sulfonation treatment described in Example I is carried out on tri-(p-tertiary butyl phenyl) phosphate to obtain the corresponding potassium sulfonate. This is then used as the sulfonated aryl phosphate in preparing a blend similar to that described in Example V. Similar results are obtained.

EXAMPLE VII

The procedure of Example V is followed except that the unsubstituted aryl phosphate is tris-(beta-naphthyl) phosphate rather than n-octyl phenyl dicresyl phosphate. Similar results are obtained.

EXAMPLE VIII

The procedure of Example I is followed except that the polymer is a fiber-forming polyethylene terephthalate. Fibers having improved receptivity for disperse and basic dyes are obtained.

EXAMPLE IX

The procedure of Example I is followed except that the polymer blended with the sulfonated aryl phosphate is a random oxymethylene copolymer, i.e., a copolymer of trioxane and 2 weight percent based on the polymerizable mixture of ethylene oxide prepared as described in U.S. Patent No. 3,027,352 and after-treated to remove unstable groups as described in application Ser. No. 102,096, filed Apr. 11, 1961. Before being mixed with the sulfonated aryl phosphate, the copolymer is further stabilized by blending with 0.5 weight percent of 2,2'-methylene bis (4-methyl 6-tertiary butyl phenol) and 0.1 weight percent of cyanoguanidine based on the weight of the polymer.

The fibers obtained have improved receptivity for disperse and basic dyes.

EXAMPLE X

The procedure of Example I is followed except that the fiber-forming polymer is cellulose triacetate containing about 61.7% of acetyl groups calculated as combined acetic acid which, together with the 5% of sulfonated aryl phosphate based on the weight of the triacetate, is dissolved in a spinning solvent consisting of 91% by weight of methylene chloride and 9% by weight of methanol to yield a spinning dope containing about 21.5% by weight of triacetate. This spinning dope is dry spun to yield fibers containing the sulfonated aryl phosphate distributed throughout their cross-section which have improved receptivity to disperse and basic dyes.

EXAMPLE XI

The procedure of Example I is followed except that the fiber-forming polymer is secondary cellulose acetate containing about 54.6% of acetyl groups calculated as combined acetic acid which, together with about 3% of the sulfonated aryl phosphate described in Example I, based on the weight of the secondary acetate, is dissolved in acetone to form a spinning dope containing about 22% by weight of the secondary acetate.

The spinning dope is dry spun to yield fibers of secondary cellulose acetate containing the sulfonated aryl phosphate dispersed throughout its cross-section, which have improved receptivity to basic dyes.

EXAMPLE XII

The procedure of Example I is followed except that the fiber-forming polymer is polyhexamethylene adipamide. After being blended with the sulfonated aryl phosphate, the polymer is melt spun to yield fibers having improved receptivity to disperse and basic dyes.

EXAMPLES XIII TO XVI

The procedure of Example I is followed except that the aryl phosphate being sulfonated is (XIII) triphenyl phosphate, (XIV) n-octyl phenyl dicresyl phosphate, (XV) tricresyl phosphate, and (XVI) tris-(phenanthryl) phosphate to obtain the corresponding potassium sulfonate, 5% of which is blended with the copolymer of 3-methyl butene-1 and n-hexadecene as described in Example I. The mixture is then melt spun into fibers, each of which has improved receptivity to disperse and basic dyes.

The sulfonates described in the foregoing examples are analyzed for chemical structure (1) by obtaining the infrared adsorption spectrum to determine the presence of a phosphate bond; (2) by determining the percent carbon, hydrogen, phosphorus, sulfur and oxygen using standard analytic procedures to determine whether the structure of the initial aryl phosphate is still intact and the probable number of sulfonic groups substituted; and (3) by reacting free sulfonic acid form of the sulfonated aryl phosphate with $PCl_5$ and then with ammonia (which forms sulfonamide groups from sulfonic acid) and then analyzing the compound to determine whether equimolar proportions of sulfur and nitrogen are present, which indicates the presence of sulfonic acid groups in the compound reacted with the $PCl_5$.

Although the foregoing examples each describe the spinning of fibers, it is to be understood that this invention may also be applied to the production of such shaped articles as films by extrusion or casting from a melt or solution, and to molded articles produced, for example, by injection, compression or blow molding, which products all have improved receptivity to basic and disperse dyes.

It is to be understood that the foregoing detailed description is given merely by way of illustration and that many variations may be made therein without departing from the spirit of my invention.

The embodiments of the invention in which an exclusive property or privilege is claimed are defined as follows:

1. A composition of improved dye receptivity consisting essentially of polymers of cellulose esters of saturated fatty acids containing from 1 to 4 carbon atoms capable of being formed into shaped articles and from 1 to 10 percent by weight, based on the weight of the polymer, of preformed sulfonated aryl phosphate.

2. A composition of improved dye receptivity consisting essentially of polymers of cellulose esters of saturated fatty acids containing from 1 to 4 carbon atoms capable of being formed into shaped articles and from 1 to 10 percent by weight, based on the weight of the polymer, of preformed aryl phosphate alkali metal sulfonate.

3. A composition of improved dye receptivity consisting essentially of polymers of cellulose esters of saturated fatty acids containing from 1 to 4 carbon atoms capable of being formed into shaped articles and from 1 to 10 percent by weight, based on the weight of the polymer, of preformed sulfonated aryl phosphate at least one aryl group of which is composed of at least 2 aromatic ring structures.

4. A shaped article having improved receptivity to disperse and basic dyes, consisting essentially of polymers of cellulose esters of saturated fatty acids containing from 1 to 4 carbon atoms, and from 1 to 10 percent by weight, based on the weight of the polymer, of preformed sulfonated aryl phosphate.

5. Filamentary material having improved receptivity to disperse and basic dyes consisting essentially of polymers of cellulose esters of saturated fatty acids containing from 1 to 4 carbon atoms, and from 1 to 10 percent by weight, based on the weight of the polymer, of preformed sulfonated aryl phosphate.

6. A composition of improved dye receptivity consisting essentially of polymers of cellulose esters of saturated fatty acids containing from 1 to 4 carbon atoms, capable of being formed into shaped articles, from 1 to 10 percent by weight, based on the weight of the polymer, of preformed sulfonated aryl phosphate, and from 3 to 10 percent by weight, based on the weight of the polymer, of preformed unsubstituted aryl phosphate.

References Cited
UNITED STATES PATENTS

| | | | |
|---|---|---|---|
| 3,558,579 | 1/1971 | Di Pietro | 106—177 X |
| 3,549,729 | 12/1970 | Di Pietro et al. | 260—947 |
| 2,071,354 | 12/1937 | Morgan | 260—947 |
| 3,432,472 | 11/1969 | Caldwell | 260—75 T |

THEODORE MORRIS, Primary Examiner

U.S. Cl. X.R.

106—193; 260—67, 75, 77.5, 85.5, 88.2, 88.7